March 3, 1970     R. C. KOESTLER     3,498,863
METHOD OF PRODUCING DECORATIVE LINES ON LAMINATED FILMS
Filed Aug. 13, 1964

United States Patent Office 3,498,863
Patented Mar. 3, 1970

3,498,863
METHOD OF PRODUCING DECORATIVE LINES ON LAMINATED FILMS
Robert C. Koestler, Chester, Pa., assignor to FMC Corporation, Philadelphia, Pa., a corporation of Delaware
Filed Aug. 13, 1964, Ser. No. 389,400
Int. Cl. B31f 1/12
U.S. Cl. 156—204                                    3 Claims

ABSTRACT OF THE DISCLOSURE

A method of producing uniformly spaced, decorative lines on laminated, non-fibrous sheets wherein the laminated sheet is folded, pressure applied to the fold and the sheet rolled perpendicularly to said fold along the line of pressure, is disclosed herein.

---

Figure 1:
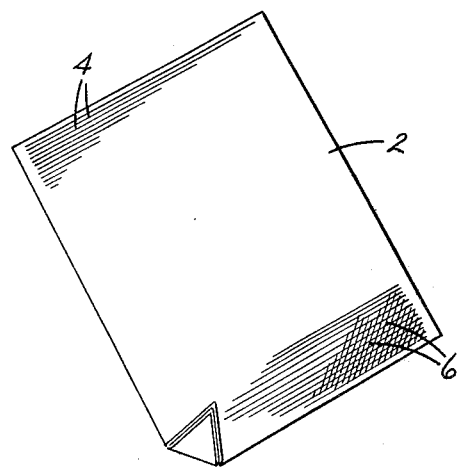
Figure 2:
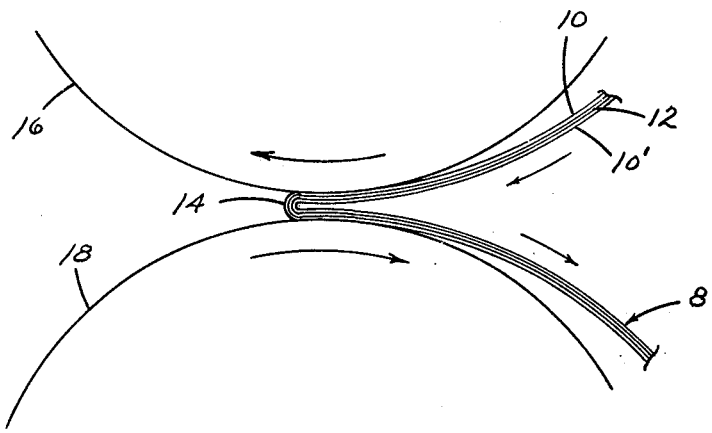

Lined or reticulated films have previously been made by employing engraved drums or ionizing radiation. Non-thermoplastic films such as regenerated cellulose film, cannot be satisfactorily engraved.

It is an object of this invention to provide a method of producing uniformly spaced lines on laminated film having a soft inner ply or layer and a relatively hard outer ply.

This and other objects are accomplished in accordance with this invention which is the method of forming spaced lines on a laminate sheet at least about 1 mil thick having a non-fibrous, flexible outer layer and a non-fibrous, flexible inner layer, said inner layer being softer than said outer layer, the method comprising folding the laminate sheet along a line, applying pressure along the fold, and rolling the sheet in a direction perpendicular to said fold along the line of applied pressure.

In the preferred embodiment of this invention the outer layers of the laminate comprise regenerated cellulose film, while the intermediate ply or layer is a softer thermoplastic material including for example, polyvinyl chloride, vinyl chloride-vinyl acetate copolymer, vinylidene chloride copolymer, polyethylene, polypropylene, etc. The outer layers may, however, consist of a harder thermoplastic film, a cellulose ether film, cellulose ester film or any non-fibrous flexible sheet which is harder than the inner layer. The laminate sheet should be no thicker than about 20 mils for the purpose of this invention.

The laminate sheet may be formed in any desired manner. For example, the outer layers and preformed inner layer may be sandwiched together under heat and pressure to form a strongly adhering composite sheet. Preferably, the preformed outer sheets have deposited between them a melt of thermoplastic resin and the construction is then run through smoothing and cooling rolls.

The pressure which is applied to the fold of the laminate determines the actual spacing of the lines formed thereon. In general, the periodicity of the lines is about 1 mm. Sufficient pressure to hold the laminate while rolling but less than that which will prevent rolling are the only limitations on the degree of pressure. It should be realized that such pressure limitations will also depend of the nature and surface characteristics of the laminate material. The outer layer must have sufficient smoothness or slip to permit it to slide over itself while the laminate is being rolled. Various methods of improving the slip surface characteristics are known and may be suitably employed for this invention if necessary.

The rolling of the folded laminate is caused by exerting a force on one side of the laminate in direction of the fold and another force on the other side of the folded laminate away from the fold. These applied forces cause the position of the fold to move across the laminate sheet in a direction perpendicular to the line of fold.

The lines on a laminate sheet, in accordance with this invention, may be formed on both sides of the laminate by repeating the process after turning the sheet. Multiple treatments and angular treatments produce varied effects on the surface of the sheet.

FIG. I of the drawing depicts the article formed by the process of this invention. Laminate 2 has a series of spaced horizontal lines 4 formed on one side thereof and a series of spaced oblique lines 6, formed on a portion of the other side.

FIG. II of the drawing shows one means for carrying out the method of this invention. A length of a laminate 8 having outer layers 10 and 10′ of regenerated cellulose film of about 1 mil thickness and inner layer 12 of polyvinyl chloride of about 0.5 mil thickness, is folded and the fold 14 inserted to about the center of the nip of counter rotating rolls 16 and 18. On rotation, the rolls will produce the desired lines on the laminate 8.

I claim:
1. A method of forming uniformly spaced lines on a laminate sheet having a non-fibrous, flexible outer layer and a non-fibrous, flexible inner layer, said inner layer being softer than said outer layer, the method consisting essentially of folding said laminate sheet along a line, applying pressure along the fold, and rolling the sheet in a direction perpendicular to said fold along the line of applied pressure.
2. A method of forming uniformly spaced lines on a laminate sheet having a regenerated cellulose film as the outer layer and a thermoplastic film as the inner layer, said inner layer being softer than said outer layer, the method comprising folding said laminate sheet along a line, applying pressure along the fold, and rolling the sheet in a direction perpendicular to said fold along the line of applied pressure.
3. The method of claim 2 wherein the thermoplastic film is polyvinyl chloride.

References Cited
UNITED STATES PATENTS 2,679,887  6/1954  Doyles et al. _____ 156—183
3,352,738  11/1967  Doll et al. _____ 156—585

JOHN T. GOOLKASIAN, Primary Examiner
H. F. EPSTEIN, Assistant Examiner

U.S. Cl. X.R.
156—183; 161—128, 251; 162—111